US012673718B2

(12) United States Patent
Birsching

(10) Patent No.: US 12,673,718 B2
(45) Date of Patent: Jul. 7, 2026

(54) SYSTEMS AND METHODS FOR CONTROLLING HANDWHEEL RETURN TO CENTER VELOCITY

(71) Applicant: STEERING SOLUTIONS IP HOLDING CORPORATION, Saginaw, MI (US)

(72) Inventor: Joel Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 455 days.

(21) Appl. No.: 18/484,067

(22) Filed: Oct. 10, 2023

(65) Prior Publication Data

US 2025/0115290 A1     Apr. 10, 2025

(51) Int. Cl.
*B62D 5/04*          (2006.01)
(52) U.S. Cl.
CPC .................................. *B62D 5/0466* (2013.01)
(58) Field of Classification Search
CPC .................................................... B62D 5/0466
See application file for complete search history.

(56) References Cited

U.S. PATENT DOCUMENTS 11,066,097 B2 * 7/2021 Prahlad ................ B62D 5/0463
2017/0066472 A1 * 3/2017 Wang ................... B62D 5/0463

2017/0066473 A1 * 3/2017 Yu ............................ B62D 6/10
2017/0232998 A1 * 8/2017 Ramanujam ........... B62D 6/008
701/42
2019/0002014 A1 * 1/2019 Shah ...................... B62D 5/046

FOREIGN PATENT DOCUMENTS

EP              1759957 A1 * 3/2007 ........... B62D 5/0463
WO      WO-2017212251 A1 * 12/2017 ........... B62D 5/0466

* cited by examiner

*Primary Examiner* — Drew J Brown
(74) *Attorney, Agent, or Firm* — Dickinson Wright PLLC

(57)          ABSTRACT

An apparatus for handwheel return to center control is configured to determine a desired velocity value based on a vehicle velocity value and a handwheel position value; determine a control velocity blend value based on the vehicle velocity value and a driver applied handwheel torque value; determine a final desired velocity value based on the desired velocity value and the control velocity blend value; determine a proportional integral control value based on the control velocity blend value and an error value associated with the final desired velocity value; determine a static return command value based on the handwheel position value and the vehicle velocity value; determine a blend command value based on the proportional integral control value and the static return command value; and selectively control a return to center of the handwheel of the vehicle based on the blend command value.

20 Claims, 8 Drawing Sheets

MOST
MEDIA ORIENTED SYSTEMS TRANSPORT
ETHERNET AVB (AUDIO VIDEO BRIDGING)
ETHERNET TSN (TIME-SENSITIVE NETWORKING)

LIN
LOCAL INTERCONNECT NETWORK
MULTIFUNCTION KEYLESS SYSTEM

CAN
CONTROLLER AREA NETWORK
COLLISION DETECTION
SYSTEM

FlexRay
BRAKE-BY-WIRE SYSTEM

ETHERNET

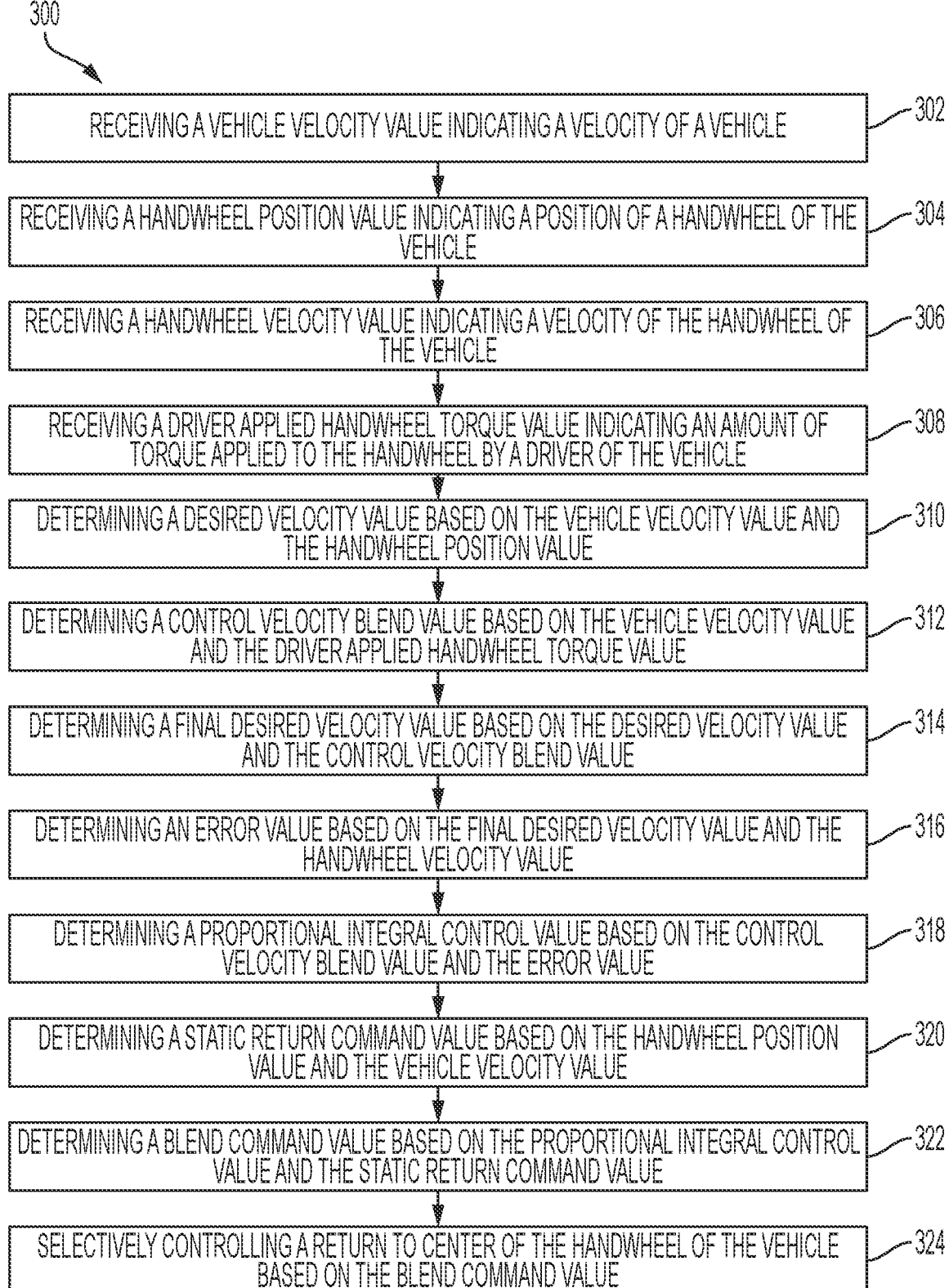

300

| | |
|---|---|
| RECEIVING A VEHICLE VELOCITY VALUE INDICATING A VELOCITY OF A VEHICLE | 302 |
| RECEIVING A HANDWHEEL POSITION VALUE INDICATING A POSITION OF A HANDWHEEL OF THE VEHICLE | 304 |
| RECEIVING A HANDWHEEL VELOCITY VALUE INDICATING A VELOCITY OF THE HANDWHEEL OF THE VEHICLE | 306 |
| RECEIVING A DRIVER APPLIED HANDWHEEL TORQUE VALUE INDICATING AN AMOUNT OF TORQUE APPLIED TO THE HANDWHEEL BY A DRIVER OF THE VEHICLE | 308 |
| DETERMINING A DESIRED VELOCITY VALUE BASED ON THE VEHICLE VELOCITY VALUE AND THE HANDWHEEL POSITION VALUE | 310 |
| DETERMINING A CONTROL VELOCITY BLEND VALUE BASED ON THE VEHICLE VELOCITY VALUE AND THE DRIVER APPLIED HANDWHEEL TORQUE VALUE | 312 |
| DETERMINING A FINAL DESIRED VELOCITY VALUE BASED ON THE DESIRED VELOCITY VALUE AND THE CONTROL VELOCITY BLEND VALUE | 314 |
| DETERMINING AN ERROR VALUE BASED ON THE FINAL DESIRED VELOCITY VALUE AND THE HANDWHEEL VELOCITY VALUE | 316 |
| DETERMINING A PROPORTIONAL INTEGRAL CONTROL VALUE BASED ON THE CONTROL VELOCITY BLEND VALUE AND THE ERROR VALUE | 318 |
| DETERMINING A STATIC RETURN COMMAND VALUE BASED ON THE HANDWHEEL POSITION VALUE AND THE VEHICLE VELOCITY VALUE | 320 |
| DETERMINING A BLEND COMMAND VALUE BASED ON THE PROPORTIONAL INTEGRAL CONTROL VALUE AND THE STATIC RETURN COMMAND VALUE | 322 |
| SELECTIVELY CONTROLLING A RETURN TO CENTER OF THE HANDWHEEL OF THE VEHICLE BASED ON THE BLEND COMMAND VALUE | 324 |

FIG. 7

SYSTEMS AND METHODS FOR CONTROLLING HANDWHEEL RETURN TO CENTER VELOCITY

TECHNICAL FIELD

This disclosure relates to vehicle steering, and in particular to systems and methods for controlling steering handwheel return to center velocity.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for handwheel return to center control. The method includes receiving a vehicle velocity value indicating a velocity of a vehicle, receiving a handwheel position value indicating a position of a handwheel of the vehicle, receiving a handwheel velocity value indicating a velocity of the handwheel of the vehicle, and receiving a driver applied handwheel torque value indicating an amount of torque applied to the handwheel by a driver of the vehicle. The method also includes determining a desired velocity value based on the vehicle velocity value and the handwheel position value, determining a control velocity blend value based on the vehicle velocity value and the driver applied handwheel torque value, and determining a final desired velocity value based on the desired velocity value and the control velocity blend value. The method also includes determining an error value based on the final desired velocity value and the handwheel velocity value, determining a proportional integral control value based on the control velocity blend value and the error value, and determining a static return command value based on the handwheel position value and the vehicle velocity value. The method also includes determining a blend command value based on the proportional integral control value and the static return command value, and selectively controlling a return to center of the handwheel of the vehicle based on the blend command value.

Another aspect of the disclosed embodiments includes a system for handwheel return to center control. The system includes a processor, and a memory. The memory includes instructions that, when executed by the processor, cause the processor to: receive a vehicle velocity value indicating a velocity of a vehicle; receive a handwheel position value indicating a position of a handwheel of the vehicle; receive a handwheel velocity value indicating a velocity of the handwheel of the vehicle; receive a driver applied handwheel torque value indicating an amount of torque applied to the handwheel by a driver of the vehicle; determine a desired velocity value based on the vehicle velocity value and the handwheel position value; determine a control velocity blend value based on the vehicle velocity value and the driver applied handwheel torque value; determine a final desired velocity value based on the desired velocity value and the control velocity blend value; determine an error value based on the final desired velocity value and the handwheel velocity value; determine a proportional integral control value based on the control velocity blend value and the error value; determine a static return command value based on the handwheel position value and the vehicle velocity value; determine a blend command value based on the proportional integral control value and the static return command value; and selectively control a return to center of the handwheel of the vehicle based on the blend command value.

Another aspect of the disclosed embodiments includes an apparatus for handwheel return to center control. The apparatus includes a processor, and a memory. The memory includes instructions that, when executed by the processor, cause the processor to: determine a desired velocity value based on a vehicle velocity value indicating a velocity of a vehicle and a handwheel position value indicating a position of a handwheel of the vehicle; determine a control velocity blend value based on the vehicle velocity value and a driver applied handwheel torque value indicating an amount of torque applied to the handwheel by a driver of the vehicle; determine a final desired velocity value based on the desired velocity value and the control velocity blend value; determine a proportional integral control value based on the control velocity blend value and an error value associated with the final desired velocity value; determine a static return command value based on the handwheel position value and the vehicle velocity value; determine a blend command value based on the proportional integral control value and the static return command value; and selectively control a return to center of the handwheel of the vehicle based on the blend command value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flow diagram generally illustrating a handwheel return to center control method according to the principles of the present disclosure.

DETAILED DESCRIPTION

Figure 1:
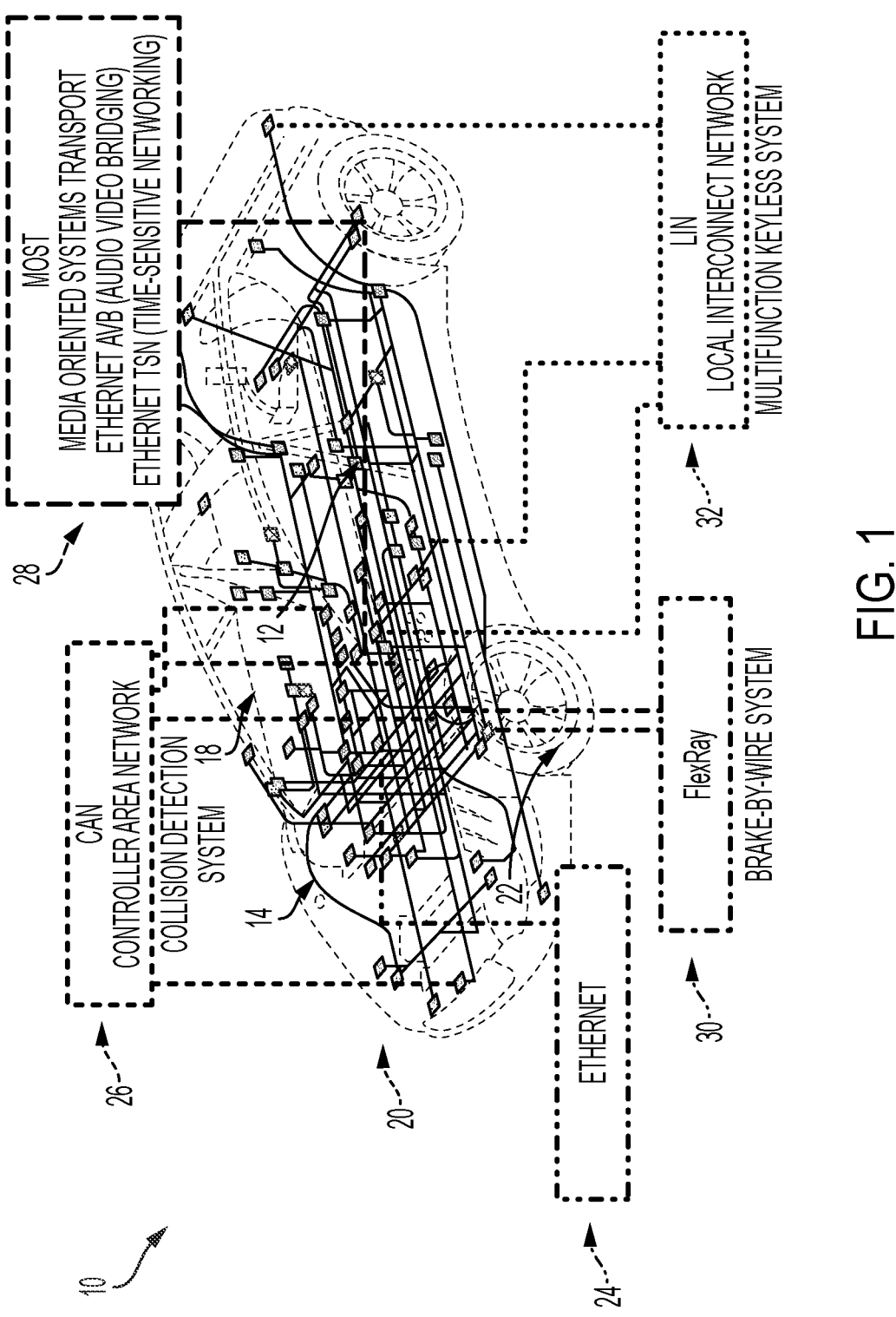
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an EPS steering system, a SbW steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

Typically, advanced steering systems allow advanced algorithms to be incorporated that provide torque signals that are added to typical assist torque. A common advanced function implemented is a return to center function. Such a return to center function provides an additional torque to return the handwheel of the vehicle to center in applications where restoring forces of vehicle tires are not enough to overcome friction levels in the steering system. For example, a return to center function may include a two-dimensional (2D) lookup table having inputs including vehicle speed and handwheel angle to determine a return torque that is added to the normal steering torque. However, changes in operating conditions and variation in friction levels can change the speed at which the handwheel returns to center, resulting in the handwheel returning too fast or too slow.

To overcome these shortcomings, advanced steering systems may employ a controlled velocity return to center function. Typically, a controlled velocity return to center function may include a target velocity block, a scale block, a proportional-integral (PI) control block, and a limit block. The controlled velocity return to center function receives signals from various controllers, from a vehicle serial communications, and/or from sensors in the system. Additionally, filters may be applied to various signals, including driver torque signals and torsion bar (T-bar) torque signals.

Typically, the target velocity block includes a 2D lookup table that uses vehicle speed and absolute values of handwheel position input signals to calculate a desired velocity magnitude. The desired velocity magnitude may have a value greater than 0 degrees per second (deg/sec) away from center and decrease to 0 deg/sec at or around 0 deg handwheel angle.

The target velocity block may also include a 2D lookup table that uses vehicle speed and absolute value of driver torque input signals to calculate a desired velocity scale factor that has a value between 0 and 1 (e.g., with the desired velocity scale factor value typically being relatively close to 1 when the driver torque values are close to 0 Newton meters (Nm) and will decrease to 0 when the driver torque values increase).

A final desired velocity signal is determined by multiplying the desired velocity scale and desired velocity magnitude together along with a term that is equal to the sign of the handwheel position signal times negative one (−1). A third term may be used to provide a desired velocity that trends toward the center position.

The scale block may include multiple blocks that calculate individual scale factors from 0 to 1 based on various input signals. For example, a T-bar torque scale factor is calculated using a 2D lookup table that uses vehicle speed and absolute value of T-bar torque input signals to calculate a scale factor that has a value between 0 and 1. All of the individual scale factors are multiplied together to produce a final control scale factor value. A velocity error signal is determined by subtracting the desired velocity from the measured handwheel velocity. This signal, along with the control scale factor signal is provided to the PI Control block. The PI Control block multiplies the control scale factor by the velocity error signal and uses a PI controller to reduce the velocity error. The output of the PI Control block is provided to a Limit block that limits the final return command within a desirable range.

Such a controlled velocity return function may have inherent shortcomings. For example, the return function may transition between the condition where the driver is allowing the steering system to return to center, and the condition where the driver is actively steering the vehicle. The desired velocity scale factor is one function used to manage this transition. This desired velocity scale factor results in a desired velocity value at or near the value determined from the desired velocity lookup table when the driver is allowing the steering system to return to center, and a value at or near 0 for the condition where the driver is actively steering the vehicle. A velocity of 0 is only desirable for a limited number of conditions when the driver is actively steering the vehicle. This can lead to large velocity error signal values provided to the PI Control Block.

In addition, a second function used to manage the transition is the control scale factor. This function has the effect of turning the return function off when the control scale factor is 0. The determination of the control scale factor has multiple lookup tables with different input signals to account for different conditions when the return function is to be turned off. When the friction level in the steering system requires high return torque, it is often desirable to have a nominal return torque even when the driver is actively steering. Setting the control scale factor to 0 can result in return torque values that are less than desirable and/or may result in relatively large changes in return torque when the return function transitions between the condition where the driver is allowing the steering system to return to center, and the condition where the driver is actively steering the vehicle. These shortcomings may result in degraded steering feel, while being difficult to tune.

Accordingly, systems and methods, such as those described herein, configured to provide improved handwheel return to center velocity control, may be desirable. In some embodiments, the systems and methods described herein may be configured to provide a controlled velocity return function that includes functionality for providing a return command for two conditions: (i) one in which the driver is allowing the system to return to center; (ii) and one in which the driver is actively steering. The systems and methods described herein may be configured to transition between the two conditions.

The systems and methods described herein may be configured to, in response to the condition in which the driver is allowing the system to return to center, determine a target velocity. The systems and methods described herein may be configured to use a PI control technique to reduce the error between the desired velocity and the measured velocity.

The systems and methods described herein may be configured to, in response to the condition in which the driver is actively steering, determine the desired velocity to be the actual handwheel velocity. Additionally, alternatively, the systems and methods described herein may be configured to provide a static return torque. The systems and methods described herein may be configured to use a blend function to transition between the two conditions. The systems and methods described herein may be configured to improve steering feel and improve system tuning capabilities.

In some embodiments, the systems and methods described herein may be configured to provide handwheel return to center control. The systems and methods described herein may be configured to receive a vehicle velocity value indicating a velocity of a vehicle. The systems and methods described herein may be configured to receive a handwheel position value indicating a position of a handwheel of the vehicle. The systems and methods described herein may be configured to receive a handwheel velocity value indicating a velocity of the handwheel of the vehicle. The systems and methods described herein may be configured to receive a driver applied handwheel torque value indicating an amount of torque applied to the handwheel by a driver of the vehicle.

The systems and methods described herein may be configured to determine a desired velocity value based on the vehicle velocity value and the handwheel position value.

The systems and methods described herein may be configured to determine a control velocity blend value based on the vehicle velocity value and the driver applied handwheel torque value.

The systems and methods described herein may be configured to determine a final desired velocity value based on the desired velocity value and the control velocity blend value. For example, the systems and methods described herein may be configured to determine the final desired velocity value by adding a result of multiplying the desired velocity value by the control velocity bend signal with a result of multiplying the handwheel velocity value by one minus the control velocity blend value. The final desired velocity value may correspond to a return to center condition where the driver of the vehicle allows the handwheel to return to a center position without engaging the handwheel.

The systems and methods described herein may be configured to determine an error value based on the final desired velocity value and the handwheel velocity value. For example, the systems and methods described herein may be configured to determine the error value by subtracting the final desired velocity value from the handwheel velocity value.

The systems and methods described herein may be configured to determine a PI control value based on the control velocity blend value and the error value. For example, the systems and methods described herein may be configured to determine the PI control value by multiplying the control velocity blend value by the error value.

The systems and methods described herein may be configured to determine a static return command value based on the handwheel position value and the vehicle velocity value. The static return command value may correspond to a return to center condition where the driver is actively steering the vehicle using the handwheel.

The systems and methods described herein may be configured to determine a blend command value based on the proportional integral control value and the static return command value.

The systems and methods described herein may be configured to selectively control a return to center of the handwheel of the vehicle based on the blend command value. For example, the systems and methods described herein may be configured to selectively control the return to center of the handwheel of the vehicle by limiting the blend command value based on the final desired velocity value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
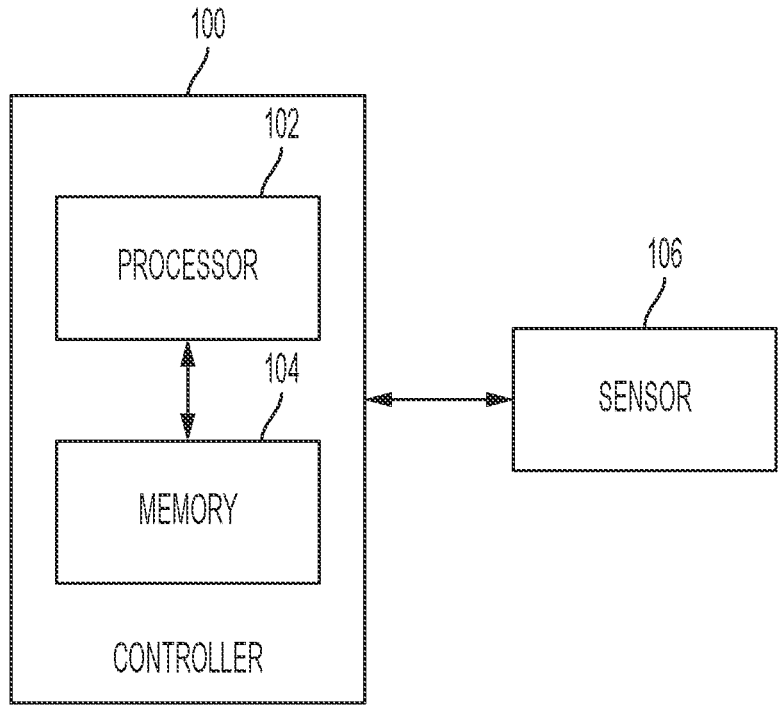
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to provide handwheel return to center control. For example, the controller 100 may determine a return command for the condition when the driver is allowing the steering system of the vehicle 10 to return to center. The controller 100 may determine the return command when the driver is actively steering the vehicle 10. The controller 100 may transition from one condition to the other.

Figure 3:
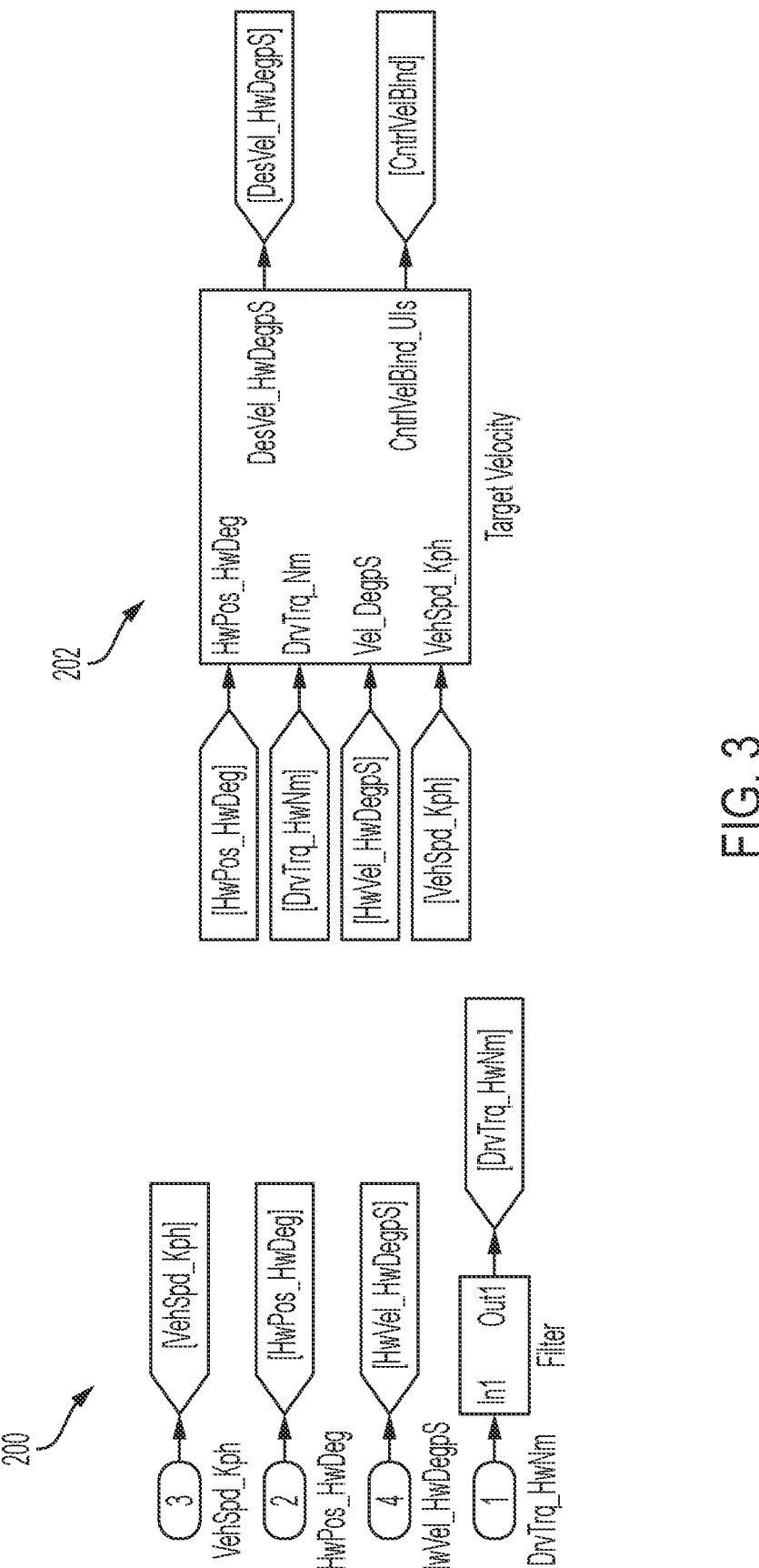
FIG. 3 generally illustrates a block diagram of a controlled velocity return technique according to the principles of the present disclosure.
Figure 3:
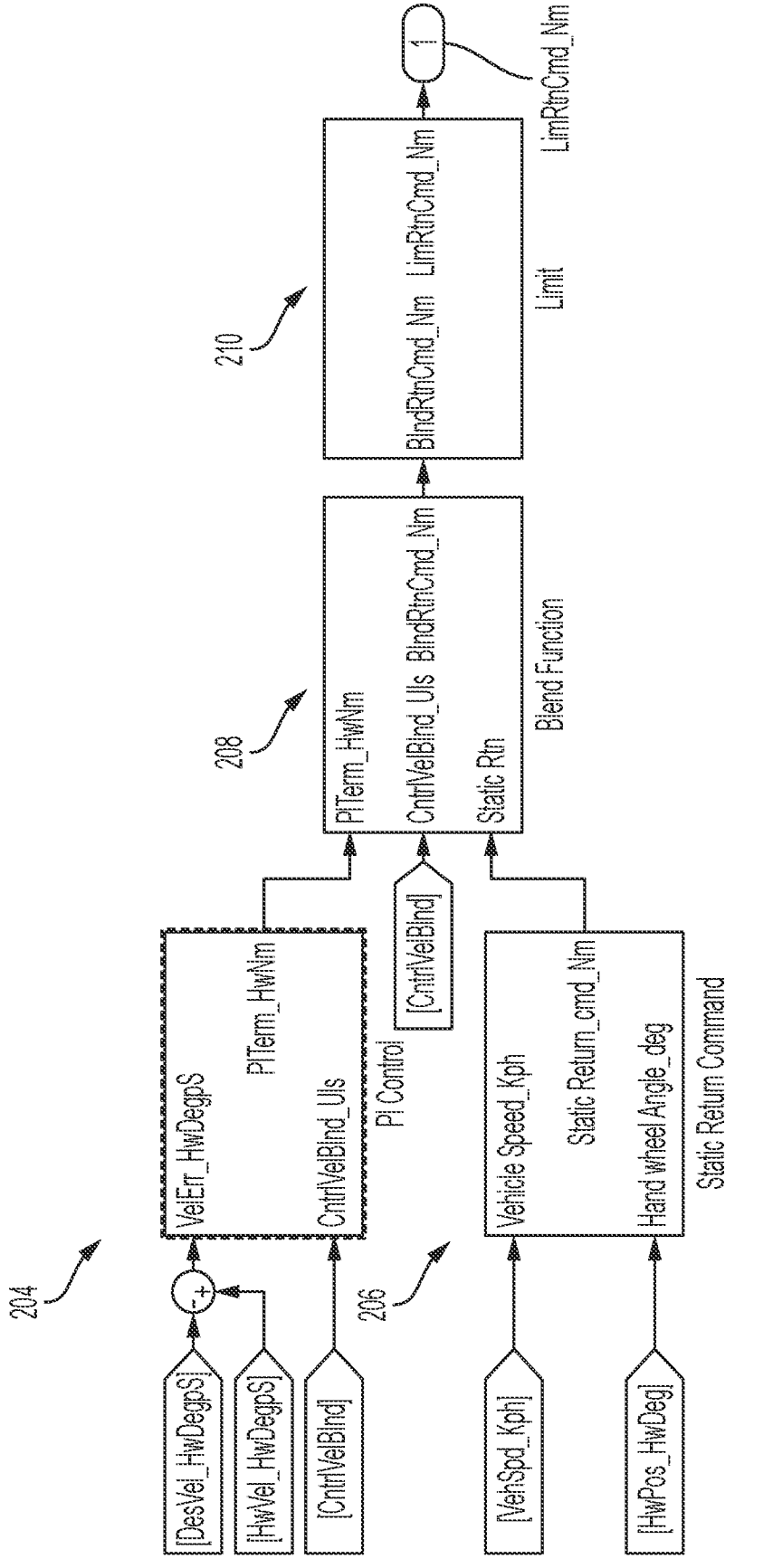

FIG. 3 generally illustrates a block diagram of controlled velocity return function 200. The controller 100 may be configured to execute, using the processor 102 or other suitable processor, instructions stored on the memory 104 or other suitable memory, to perform the function 200. For example, the controller 100 may receive various signals from the sensors 106 or from any suitable source. The controller 100 may apply filters to the signals as shown on a driver torque signal.

Figure 4:
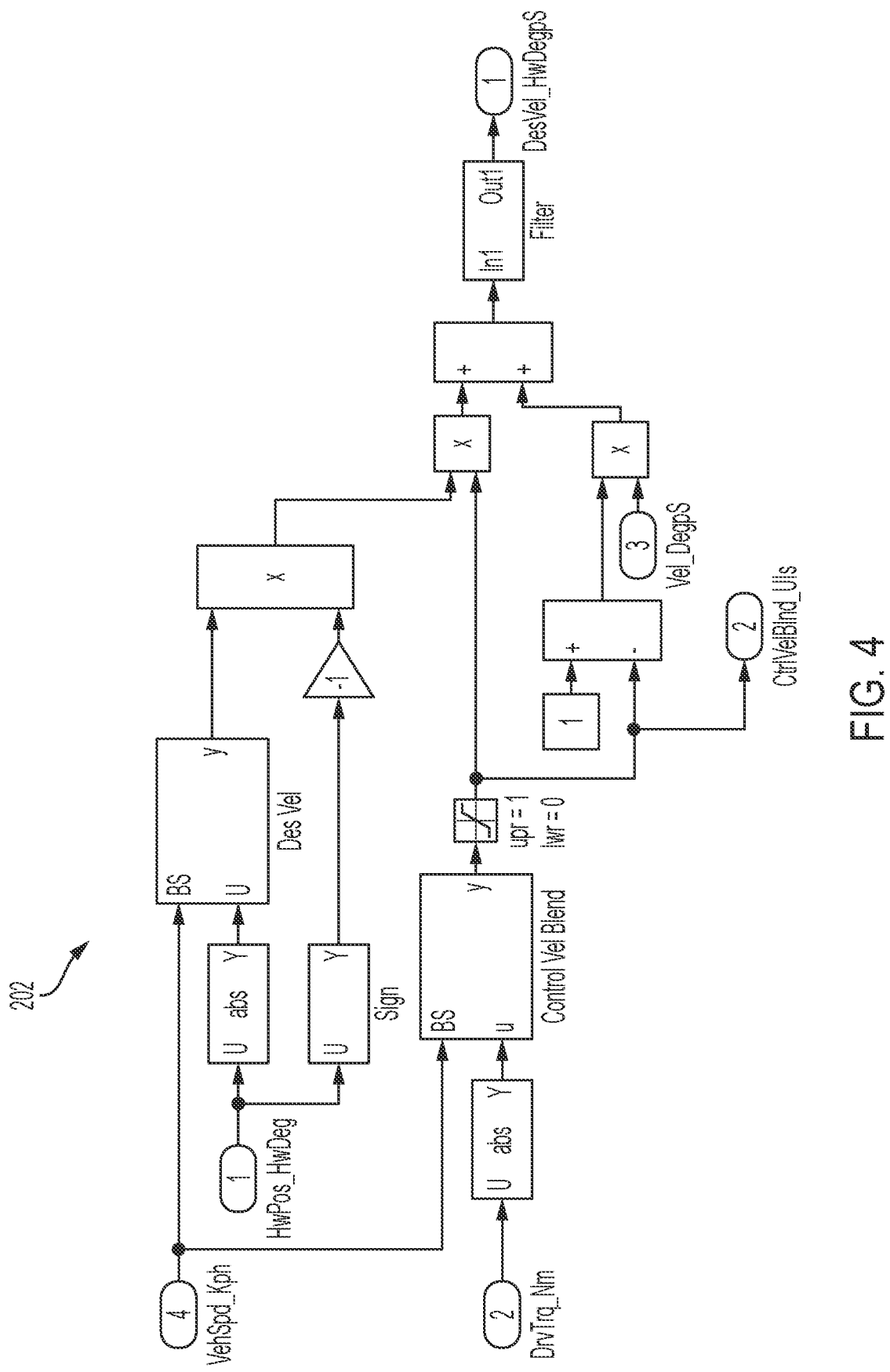
FIG. 4 generally illustrates a block diagram of a target velocity technique according to the principles of the present disclosure.
Figure 5:
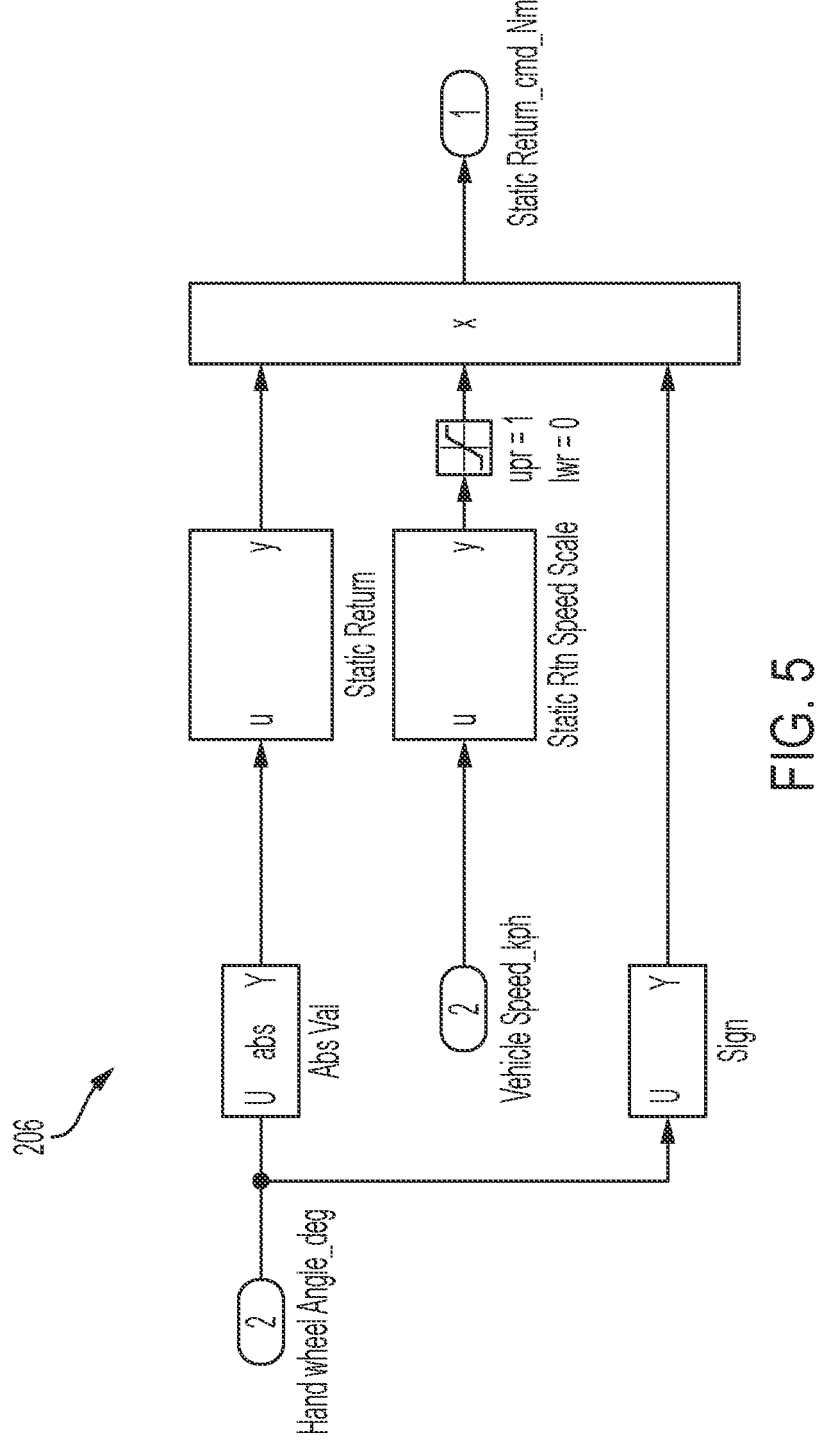
FIG. 5 generally illustrates a block diagram of a static return command technique according to the principles of the present disclosure.
Figure 6:
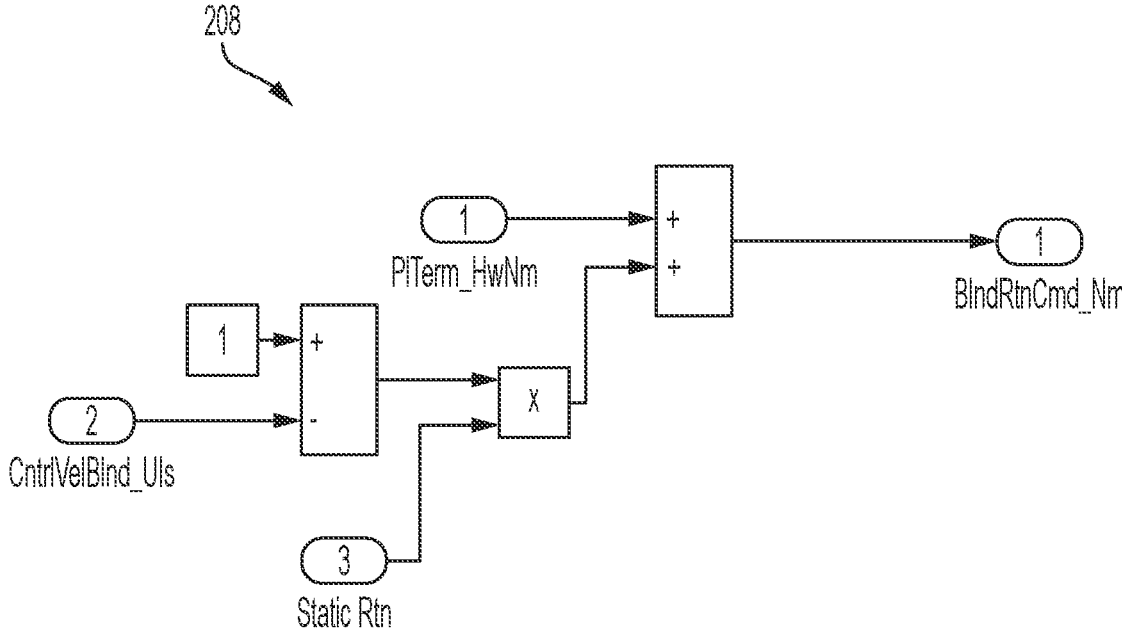
FIG. 6 generally illustrates a block diagram of a blend technique according to the principles of the present disclosure.

The function 200 may include a target velocity block 202 (e.g., generally illustrated in FIG. 3 and FIG. 4), a PI control block 204, a static return command block 206 (e.g., generally illustrated in FIG. 3 and FIG. 5), a blend function block 208 (e.g., generally illustrated in FIG. 3 and FIG. 6), and a limit block 210.

The controller 100, using the target velocity block 202, may provide a desired velocity signal and a control velocity blend signal. The target velocity block 202 may include a 2D lookup table that uses vehicle speed and absolute value of handwheel position input signals to calculate a desired velocity magnitude. The desired velocity magnitude may have a value greater than 0 deg/sec away from center and may decrease to 0 deg/sec at or substantially at a 0 deg handwheel angle. The controller 100 may multiply the desired velocity magnitude by a term that is equal to the sign of the handwheel position signal multiplied by −1, which may provide a desired velocity that trends toward the center position.

The controller 100 may use, using the target velocity block 202, vehicle speed and absolute values of driver torque input signals to calculate a controlled velocity blend signal having a controlled velocity blend factor value that may have a value limited between 0 and 1. The controlled velocity blend factor value may be at or substantially at 1 when the driver torque values are at or substantially at 0 Nm and may decrease to 0 when the driver torque values increase.

The controller 100 may calculate the desired velocity using the lookup table, which represents the desired velocity for the condition when the driver is allowing the steering system to return to center. The desired velocity for the condition in which the driver is actively steering may correspond to a measured handwheel velocity (e.g., which may provide a velocity error signal of 0 for all conditions when the driver is actively steering).

In some embodiments, the controller 100 may use the control velocity blend signal to transition between these two conditions. The controller 100 may determine the final desired velocity signal by multiplying the desired velocity calculated from the lookup table by the control velocity blend signal, multiplying the measured handwheel velocity signal by one minus the control velocity blend signal, and adding the two results. The controller 100 may apply a filter to the final desired velocity signal.

In some embodiments, the controller 100 may determine a velocity error signal by subtracting the desired velocity from the measured handwheel velocity. The controller 100 may provide the velocity error signal and the control velocity blend signal to the PI control block 204.

The controller 100, using the PI control block 204 may multiply the control velocity blend signal by the velocity error signal to reduce the velocity error. The controller 100 may provide the output of the PI control block 204 to the blend function block 208.

In some embodiments, the controller 100 may, using the static return command block 206, provide a return torque for the condition when the driver is actively steering the vehicle 10. The controller 100 may calculate a return torque magnitude using a lookup table of the static return command block 206 that uses the absolute value of the handwheel position input signal. The controller 100 may calculate a scale factor using the lookup table of the static return command block 206 that uses the vehicle speed input signal. The scale factor may be limited to a value between 0 and 1. The controller 100 may determine a final static return command by multiplying the return torque magnitude, the scale factor, and a term that is equal to the sign of the handwheel position. Additionally, or alternatively, the controller 100 may calculate the static return command by replacing the two individual lookup tables with a single 2D lookup table with vehicle Speed and absolute values of handwheel position signals as inputs.

The controller 100 may receive, at the blend function block 208, the PI term from the output of the PI control block 204 and the static return command from the static return block 206. The controller 100 calculates, using the blend function block 208, a blended return command by multiplying the static return command signal by one minus the control velocity blend signal, and adding the result to the PI term. The controller 100 may provide the output of the blend function block 208 to the limit block 210, which the controller 100 may use to limit the final return command within a desirable range.

In some embodiments, the controller 100 may receive, from one or more of the sensors 106 or other suitable source, a vehicle velocity value indicating a velocity of the vehicle 10. The controller 100 may receive, from one or more of the sensors 106 or other suitable source, a handwheel position value indicating a position of a handwheel of the vehicle 10. The controller 100 may receive, from one or more of the sensors 106 or other suitable source, a handwheel velocity value indicating a velocity of the handwheel of the vehicle 10. The controller 100 may receive, from one or more of the sensors 106 or other suitable source, a driver applied handwheel torque value indicating an amount of torque applied to the handwheel by a driver of the vehicle 10.

The controller 100 may determine a desired velocity value based on the vehicle velocity value and the handwheel position value. The controller 100 may determine a control velocity blend value based on the vehicle velocity value and the driver applied handwheel torque value. The controller 100 may determine a final desired velocity value based on the desired velocity value and the control velocity blend value. For example, the controller 100 may determine the final desired velocity value by adding a result of multiplying the desired velocity value by the control velocity bend signal with a result of multiplying the handwheel velocity value by one minus the control velocity blend value. The final desired velocity value may correspond to a return to center condition where the driver of the vehicle 10 allows the handwheel to return to a center position without engaging the handwheel.

The controller 100 may determine an error value based on the final desired velocity value and the handwheel velocity value. For example, the controller 100 may determine the error value by subtracting the final desired velocity value from the handwheel velocity value.

The controller 100 may determine a PI control value based on the control velocity blend value and the error value. For example, the controller 100 may determine the PI control value by multiplying the control velocity blend value by the error value.

The controller 100 may determine a static return command value based on the handwheel position value and the vehicle velocity value. The static return command value may correspond to a return to center condition where the driver is actively steering the vehicle using the handwheel. The controller 100 may determine a blend command value based on the proportional integral control value and the static return command value.

The controller 100 may selectively control a return to center of the handwheel of the vehicle 10 based on the blend command value. For example, the controller 100 may selectively control the return to center of the handwheel of the vehicle by limiting the blend command value based on the final desired velocity value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 7 is a flow diagram generally illustrating a handwheel return to center control method 300 according to the principles of the present disclosure. At 302, the method 300 receives a vehicle velocity value indicating a velocity of a vehicle. For example, the controller 100 may receive the vehicle velocity value indicating the velocity of the vehicle 10.

At 304, the method 300 receives a handwheel position value indicating a position of a handwheel of the vehicle. For example, the controller 100 may receive the handwheel position value indicating the position of the handwheel of the vehicle 10.

At 306, the method 300 receives a handwheel velocity value indicating a velocity of the handwheel of the vehicle. For example, the controller 100 may receive the handwheel velocity value indicating the velocity of the handwheel of the vehicle 10.

At 308, the method 300 receives a driver applied handwheel torque value indicating an amount of torque applied to the handwheel by a driver of the vehicle. For example, the controller 100 may receive the driver applied handwheel toque value indicating the amount of torque applied to the handwheel by the driver of the vehicle 10.

At 310, the method 300 determines a desired velocity value based on the vehicle velocity value and the handwheel position value. For example, the controller 100 may determine the desired velocity value based on the vehicle velocity and the handwheel position value.

At 312, the method 300 determines a control velocity blend value based on the vehicle velocity value and the driver applied handwheel torque value. For example, the controller 100 may determine the control velocity blend value based on the vehicle velocity value and the driver applied handwheel torque value.

At 314, the method 300 determines a final desired velocity value based on the desired velocity value and the control velocity blend value. For example, the controller 100 may determine the final desired velocity value based on the desired velocity value and the control velocity blend value.

At 316, the method 300 determines an error value based on the final desired velocity value and the handwheel velocity value. For example, the controller 100 may determine the error value based on the final desired velocity value and the handwheel velocity value.

At 318, the method 300 determines a PI control value based on the control velocity blend value and the error value. For example, the controller 100 may determine the PI control value based on the control velocity blend value and the error value.

At 320, the method 300 determines a static return command value based on the handwheel position value and the vehicle velocity value. For example, the controller 100 may determine the static return command value based on the handwheel position value and the vehicle velocity value.

At 322, the method 300 determines a blend command value based on the PI control value and the static return command value. For example, the controller 100 may determine the blend command value based on the PI control value and the static return command value.

At 324, the method 300 selectively controls a return to center of the handwheel of the vehicle based on the blend command value. For example, the controller 100 may selectively control the return to center of the handwheel of the vehicle based on the blend command value.

In some embodiments, a method for handwheel return to center control includes receiving a vehicle velocity value indicating a velocity of a vehicle, receiving a handwheel position value indicating a position of a handwheel of the vehicle, receiving a handwheel velocity value indicating a velocity of the handwheel of the vehicle, and receiving a driver applied handwheel torque value indicating an amount of torque applied to the handwheel by a driver of the vehicle. The method also includes determining a desired velocity value based on the vehicle velocity value and the handwheel position value, determining a control velocity blend value based on the vehicle velocity value and the driver applied handwheel torque value, and determining a final desired velocity value based on the desired velocity value and the control velocity blend value. The method also includes determining an error value based on the final desired velocity value and the handwheel velocity value, determining a proportional integral control value based on the control velocity blend value and the error value, and determining a static return command value based on the handwheel position value and the vehicle velocity value. The method also includes determining a blend command value based on the proportional integral control value and the static return command value, and selectively controlling a return to center of the handwheel of the vehicle based on the blend command value.

In some embodiments, the final desired velocity value corresponds to a return to center condition where the driver of the vehicle allows the handwheel to return to a center position without engaging the handwheel. In some embodiments, the static return command value corresponds to a return to center condition where the driver is actively steering the vehicle using the handwheel. In some embodiments, determining the final desired velocity value based on the desired velocity value and the control velocity blend value includes multiplying the desired velocity value by the control velocity bend signal. In some embodiments, determining the final desired velocity value based on the desired velocity value and the control velocity blend value further includes determining the final desired velocity value by adding a result of multiplying the desired velocity value by the control velocity bend value with a result of multiplying the handwheel velocity value by one minus the control velocity blend value. In some embodiments, determining the error value based on the final desired velocity value and the handwheel velocity value includes subtracting the final desired velocity value from the handwheel velocity value. In some embodiments, determining the proportional integral control value based on the control velocity blend value and the error value includes multiplying the control velocity blend value by the error value. In some embodiments, selectively controlling the return to center of the handwheel of the vehicle based on the blend command value includes limiting the blend command value based on the final desired velocity value. In some embodiments, the handwheel is associated with a steer-by-wire steering system. In some embodiments, the handwheel is associated with an electronic power steering system.

In some embodiments, a system for handwheel return to center control includes a processor, and a memory. The memory includes instructions that, when executed by the processor, cause the processor to: receive a vehicle velocity value indicating a velocity of a vehicle; receive a handwheel position value indicating a position of a handwheel of the vehicle; receive a handwheel velocity value indicating a velocity of the handwheel of the vehicle; receive a driver applied handwheel torque value indicating an amount of torque applied to the handwheel by a driver of the vehicle; determine a desired velocity value based on the vehicle velocity value and the handwheel position value; determine a control velocity blend value based on the vehicle velocity value and the driver applied handwheel torque value; determine a final desired velocity value based on the desired velocity value and the control velocity blend value; determine an error value based on the final desired velocity value and the handwheel velocity value; determine a proportional integral control value based on the control velocity blend value and the error value; determine a static return command value based on the handwheel position value and the vehicle velocity value; determine a blend command value based on the proportional integral control value and the static return command value; and selectively control a return to center of the handwheel of the vehicle based on the blend command value.

In some embodiments, the final desired velocity value corresponds to a return to center condition where the driver of the vehicle allows the handwheel to return to a center position without engaging the handwheel. In some embodiments, the static return command value corresponds to a return to center condition where the driver is actively steering the vehicle using the handwheel. In some embodiments, the instructions further cause the processor to determine the final desired velocity value based on the desired velocity value and the control velocity blend value by determining the final desired velocity value by adding a result of multiplying the desired velocity value by the control velocity bend signal with a result of multiplying the handwheel velocity value by one minus the control velocity blend value. In some embodiments, the instructions further cause the processor to determine the error value based on the final desired velocity value and the handwheel velocity value by subtracting the final desired velocity value from the handwheel velocity value. In some embodiments, the instructions further cause the processor to determine the proportional integral control value based on the control velocity blend value and the error value by multiplying the control velocity blend value by the error value. In some embodiments, the instructions further cause the processor to selectively control the return to center of the handwheel of the vehicle based on the blend command value by limiting the blend command value based on the final desired velocity value. In some embodiments, the handwheel is associated with a steer-by-wire steering system. In some embodiments, the handwheel is associated with an electronic power steering system.

In some embodiments, an apparatus for handwheel return to center control includes a processor, and a memory. The memory includes instructions that, when executed by the processor, cause the processor to: determine a desired velocity value based on a vehicle velocity value indicating a velocity of a vehicle and a handwheel position value indicating a position of a handwheel of the vehicle; determine a control velocity blend value based on the vehicle velocity value and a driver applied handwheel torque value indicating an amount of torque applied to the handwheel by a driver of the vehicle; determine a final desired velocity value based on the desired velocity value and the control velocity blend value; determine a proportional integral control value based on the control velocity blend value and an error value associated with the final desired velocity value; determine a static return command value based on the handwheel position value and the vehicle velocity value; determine a blend command value based on the proportional integral control value and the static return command value; and selectively control a return to center of the handwheel of the vehicle based on the blend command value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for handwheel return to center control, the method comprising:
    receiving a vehicle velocity value indicating a velocity of a vehicle;
    receiving a handwheel position value indicating a position of a handwheel of the vehicle;
    receiving a handwheel velocity value indicating a velocity of the handwheel of the vehicle;
    receiving a driver applied handwheel torque value indicating an amount of torque applied to the handwheel by a driver of the vehicle;
    determining a desired velocity value based on the vehicle velocity value and the handwheel position value;
    determining a control velocity blend value based on the vehicle velocity value and the driver applied handwheel torque value;
    determining a final desired velocity value based on the desired velocity value and the control velocity blend value;
    determining an error value based on the final desired velocity value and the handwheel velocity value;
    determining a proportional integral control value based on the control velocity blend value and the error value;
    determining a static return command value based on the handwheel position value and the vehicle velocity value;
    determining a blend command value based on the proportional integral control value and the static return command value; and
    selectively controlling a return to center of the handwheel of the vehicle based on the blend command value.

2. The method of claim 1, wherein the final desired velocity value corresponds to a return to center condition where the driver of the vehicle allows the handwheel to return to a center position without engaging the handwheel.

3. The method of claim 1, wherein the static return command value corresponds to a return to center condition where the driver is actively steering the vehicle using the handwheel.

4. The method of claim 1, wherein determining the final desired velocity value based on the desired velocity value and the control velocity blend value includes multiplying the desired velocity value by the control velocity bend signal.

5. The method of claim 4, wherein determining the final desired velocity value based on the desired velocity value and the control velocity blend value further includes determining the final desired velocity value by adding a result of multiplying the desired velocity value by the control velocity bend value with a result of multiplying the handwheel velocity value by one minus the control velocity blend value.

6. The method of claim 1, wherein determining the error value based on the final desired velocity value and the handwheel velocity value includes subtracting the final desired velocity value from the handwheel velocity value.

7. The method of claim 1, wherein determining the proportional integral control value based on the control velocity blend value and the error value includes multiplying the control velocity blend value by the error value.

8. The method of claim 1, wherein selectively controlling the return to center of the handwheel of the vehicle based on the blend command value includes limiting the blend command value based on the final desired velocity value.

9. The method of claim 1, wherein the handwheel is associated with a steer-by-wire steering system.

10. The method of claim 1, wherein the handwheel is associated with an electronic power steering system.

11. A system for handwheel return to center control, the system comprising:
    a processor; and
    a memory including instructions that, when executed by the processor, cause the processor to:
        receive a vehicle velocity value indicating a velocity of a vehicle;
        receive a handwheel position value indicating a position of a handwheel of the vehicle;
        receive a handwheel velocity value indicating a velocity of the handwheel of the vehicle;
        receive a driver applied handwheel torque value indicating an amount of torque applied to the handwheel by a driver of the vehicle;
        determine a desired velocity value based on the vehicle velocity value and the handwheel position value;
        determine a control velocity blend value based on the vehicle velocity value and the driver applied handwheel torque value;
        determine a final desired velocity value based on the desired velocity value and the control velocity blend value;
        determine an error value based on the final desired velocity value and the handwheel velocity value;
        determine a proportional integral control value based on the control velocity blend value and the error value;
        determine a static return command value based on the handwheel position value and the vehicle velocity value;
        determine a blend command value based on the proportional integral control value and the static return command value; and
        selectively control a return to center of the handwheel of the vehicle based on the blend command value.

12. The system of claim 11, wherein the final desired velocity value corresponds to a return to center condition where the driver of the vehicle allows the handwheel to return to a center position without engaging the handwheel.

13. The system of claim 11, wherein the static return command value corresponds to a return to center condition where the driver is actively steering the vehicle using the handwheel.

14. The system of claim 11, wherein the instructions further cause the processor to determine the final desired velocity value based on the desired velocity value and the control velocity blend value by determining the final desired velocity value by adding a result of multiplying the desired velocity value by the control velocity bend signal with a result of multiplying the handwheel velocity value by one minus the control velocity blend value.

15. The system of claim 11, wherein the instructions further cause the processor to determine the error value based on the final desired velocity value and the handwheel velocity value by subtracting the final desired velocity value from the handwheel velocity value.

16. The system of claim 11, wherein the instructions further cause the processor to determine the proportional integral control value based on the control velocity blend value and the error value by multiplying the control velocity blend value by the error value.

17. The system of claim 11, wherein the instructions further cause the processor to selectively control the return to center of the handwheel of the vehicle based on the blend command value by limiting the blend command value based on the final desired velocity value.

18. The system of claim 11, wherein the handwheel is associated with a steer-by-wire steering system.

19. The system of claim 11, wherein the handwheel is associated with an electronic power steering system.

20. An apparatus for handwheel return to center control, the apparatus comprising:

a processor; and a memory including instructions that, when executed by the processor, cause the processor to:

determine a desired velocity value based on a vehicle velocity value indicating a velocity of a vehicle and a handwheel position value indicating a position of a handwheel of the vehicle;

determine a control velocity blend value based on the vehicle velocity value and a driver applied handwheel torque value indicating an amount of torque applied to the handwheel by a driver of the vehicle;

determine a final desired velocity value based on the desired velocity value and the control velocity blend value;

determine a proportional integral control value based on the control velocity blend value and an error value associated with the final desired velocity value;

determine a static return command value based on the handwheel position value and the vehicle velocity value;

determine a blend command value based on the proportional integral control value and the static return command value; and selectively control a return to center of the handwheel of the vehicle based on the blend command value.

* * * * *